United States Patent Office 2,861,141
Patented Nov. 18, 1958

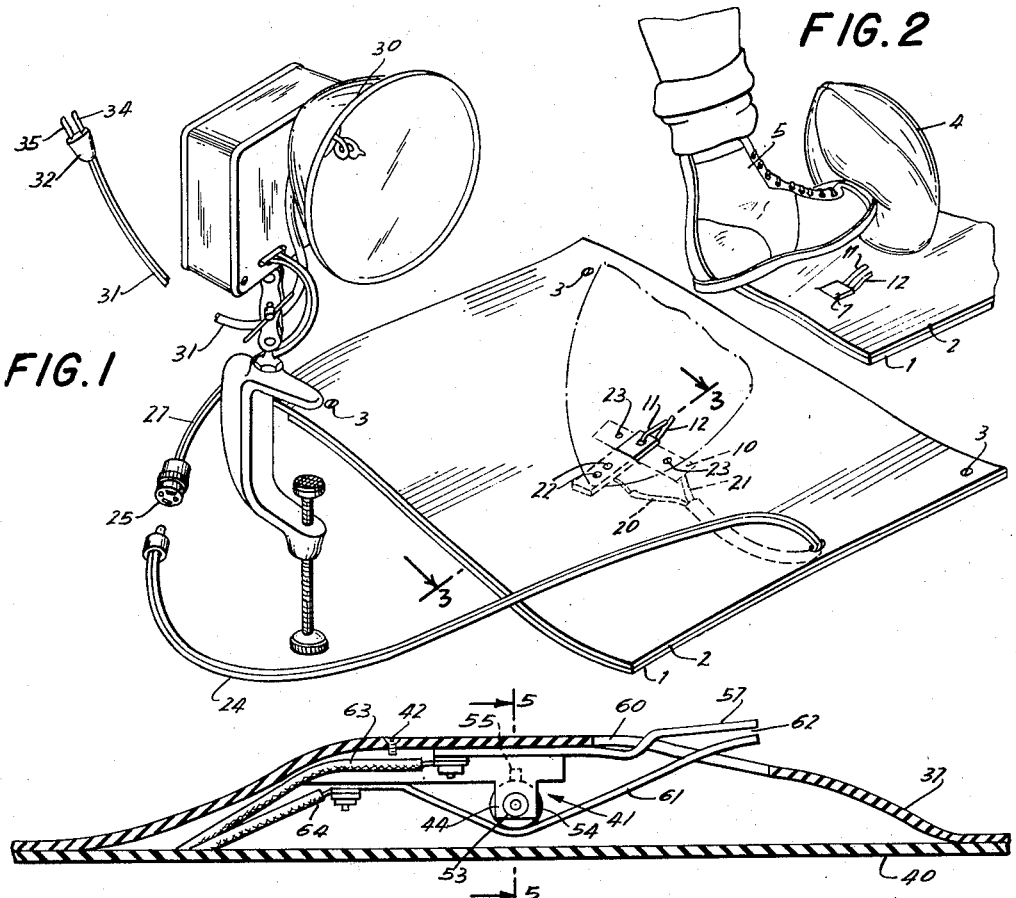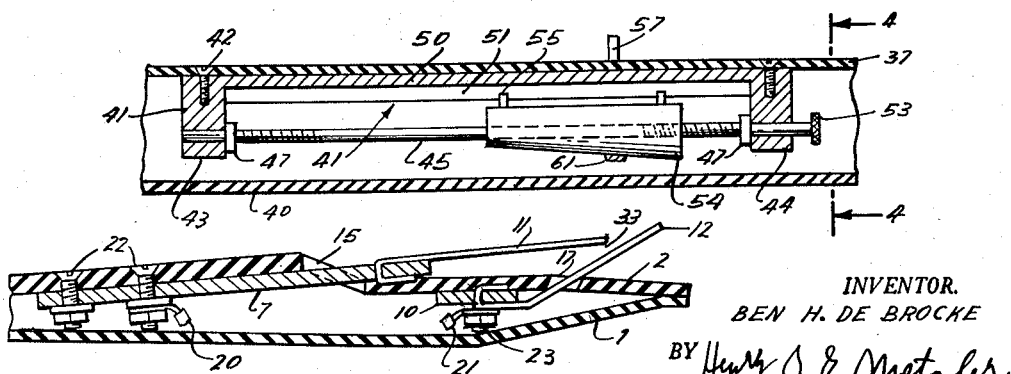

2,861,141

IMPACT ACTUATED CIRCUIT CLOSERS, ADJUSTABLE FOR SIMULTANEOUS AND DELAYED ACTION

Ben H. De Brocke, Hicksville, N. Y.

Application January 28, 1957, Serial No. 636,579

2 Claims. (Cl. 200—61.41)

The present invention relates to improvements in photography with the use of a stroboscopic light and, more specifically, to a new and improved device for closing an electric circuit of a stroboscopic light or the like by the impact of an action which is to be photographed.

Various devices have been constructed for causing the flashing of a flash bulb simultaneously with the opening of a shutter of a camera. However, these devices are not satisfactory for photographing a very quick action at a split-second period of time at which such an action takes place. For instance, to illustrate in a science class what takes place when a glass is hit and breaks, or when an egg breaks; or to find out exactly how a golf player or a football player hits a ball, so that if he hits it wrongly one may see exactly what he is doing wrong; or to show exactly how expert players of golf or the like hit a ball, so that the correct action can be studied and others can be instructed accordingly; or for studying the performance and structure of safety devices, for instance to show what happens to a safety belt or the like when an automobile hits an obstacle; or for medical studies, for instance to show what happens if a part of the body (a foot or the like) is suddenly exposed to pressure at an impact or the like; for all these and other purposes it is necessary to obtain a picture at a high intensity of light simultaneously with the taking place of the action which is to be photographed, or within a predetermined very short period of time thereafter.

Therefore, one object of the present invention is the provision of a device of the character described which will cause the very action itself which is to be photographed, for instance an impact or the like, to close an electric circuit of a stroboscope, so that an exact picture will be obtained by means of a photographic camera the shutter of which has been set at about one-tenth of a second and has been opened shortly before the impact or action to be photographed has taken place.

Another object of the present invention is the provision of a device of the character described which is light in weight and of a comparatively small size, so that it can be carried conveniently from place to place, and can be set up in such a manner that it will not be in the way of a person or object carrying out the act to be photographed.

A further object of the present invention is the provision of a device of the character described which is simple in construction and reliable in operation as well as sturdy, durable, and well adapted for withstanding the rough usage to which devices of this kind ordinarily are subjected.

With the foregoing and other objects in view which will appear as the description proceeds, the invention consists of certain novel details of construction and combinations of parts hereinafter more fully described and pointed out in the claims, it being understood that changes may be made in the construction and arrangements of parts without departing from the spirit of the invention as claimed.

In the accompanying drawing a preferred form of the invention has been shown.

In said drawing:

Figure 1 is a perspective view of a preferred embodiment of my invention together with a stroboscope.

Fig. 2 is a fractional perspective view of the device showing the same in use with a football at the instant the football is being hit by the foot of a player;

Fig. 3 is an enlarged cross-sectional fractional view on the line 3—3 of Fig. 1;

Fig. 4 is a fractional cross-sectional view of an adjustable modification of my invention on the line 4—4 of Fig. 5; and, Fig. 5 is a fractional sectional view on the line 5—5 of Fig. 4.

Similar reference characters refer to similar parts throughout the several views.

Referring first to Figs. 1, 2 and 3, the numerals 1 and 2 denote a pair of sheets of rubber, or of any other suitable material, which are placed one on top of the other, and which are connected to each other preferably on only three corner portions by means of rivets, or countersunk, short screws 3, or the like (Fig. 1), so that the sheets 1 and 2 form a carpet-like member adapted for being placed flat on a floor or the like. Any suitable contact device is mounted between the sheets 1 and 2 and is constructed and arranged in such a manner that it will close an electric circuit if an impact is exerted upon an object placed on the sheet 2, for instance if a football 4 is hit by a player's foot 5, as may be seen in Fig. 2. It is the momentary result of the impact, for instance the bending or deforming of the ball 4 at the impact, which is to be photographed. As per Figs. 1, 2 and 3 said contact device consists of a pair of conductive bars 7 and 10 from which are extended conductive, resilient, bendable contact fingers 11 and 12 respectively. The bar 7 is obliquely extended through a slot 15 in the sheet 2. The bar 10 preferably is right angularly disposed to the bar 7 and is entirely concealed by the sheets 1 and 2, between which it is located. The finger 12 is obliquely extended through a hole 17 (Fig. 3) in the sheet 2. The fingers 11 and 12 are conductively connected to, and firmly secured to the bars 7 and 10 respectively and wires 20 and 21 are conductively connected to the bars 7 and 10 respectively. The bars 7 and 10 are secured to the sheet 2 by means of countersunk, short screws 22 and 23 respectively or by any other suitable fastening means.

The wires 20 and 21 are united to a cable 24 which is detachably connected by means of a plug-in socket connection 25 or the like to a so-called "switch line" 27 of a stroboscope 30, which can be connected to a source of current (not shown) by means of a cable 31 and a plug 32.

The gap 33 (Fig. 5) between the free outer ends of the contact fingers 11 and 12 can be adjusted by bending the finger 12 toward the finger 11, for reducing the width of the gap 33; or by bending the finger 12 away from the finger 11, for increasing the width of the gap 33. According to the size of the gap 33 members 11 and 12 touch each other either simultaneously with the exertion of an impact upon an object placed upon the sheet 2, or a very short period of time thereafter. When the members 11 and 12 touch each other, an electric current passes from a terminal 34 of the plug 32, through the wire 20, the plate 7, the member 11, the member 12, the plate 10, the wire 21, the stroboscope 30 to the terminal 35 of the plug 32, thereby causing a lightening flashing of the stroboscope 30 and causing the impact action to be photographed as previously referred to.

According to the modification of Figs. 4 and 5 there is located between a pair of sheets 37 and 40, which may be the same or similar sheets as the sheets 1 and 2 of Figs. 1, 2 and 3, a contact device which allows a finer adjustment than is possible by bending the member 12 of Figs. 1, 2 and 3. In this case I prefer to attach an insulating bracket member 41 to the sheet 37 by means of screws 42 or the like. The member 41 has a pair of bearing portions 43 and 44 in which is freely rotatable a threaded spindle 45. The spindle 45 has a pair of collars 47 for preventing an axial movement of the spindle 45 relative to the member 41. The bearing portions 43 and 44 are joined to each other by an intermediate longitudinal portion 50, which has a longitudinal groove 51. A knuried knob 53 is secured to one end of the spindle 45 for facilitating the rotating of the same, and the threaded main portion of the spindle 45, is extended through, and engages, a threaded bore in a wedge-shaped member 54, which has one or more lug portions 55 that engage, and are slidable in, the groove 51. A first resilient contact finger 57 is secured to an upper section of the insulating bracket member 41, and is extended through a slot 60 in the sheet 37. A second resilient contact finger 61 is secured to a lower section of the member 41, and is in frictional engagement with the wedge-shaped member 54. The resiliency of the finger 61 tends to force the same toward the member 54 and the finger 57. Thus the gap 62 between the fingers 57 and 61 will be decreased in size if the member 54 is being shifted toward the bearing portion 44 by rotating the knob 53; or the size of the gap 62 will be increased by moving the member 54 toward the bearing portion 43. Wires 63 and 64 (Fig. 4), which are equivalent to the wires 20 and 21 of Figs. 1, 2 and 3, are conductively connected to the fingers 57 and 61. While only one contact device has been shown between each pair of sheets, it will be obvious that several such devices can be placed in the path of a moving object for continually photographing succeeding movements of an athlete or of a machine, or the like.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. An impact-actuated circuit closer comprising a carpet-like member consisting of a pair of sheets of insulating material portions of which are fastened to each other and one of which is placed upon the other, a first conductive member having a main portion located between said sheets and being secured to a first one of the sheets and having also an end portion extending through said first sheet, a second conductive member between said sheets being secured to the first sheet and being in spaced relation to said first conductive member and being obliquely inclined in the same direction as said first conductive member, a first resilient contact extending from that end portion of said first conductive member which is extended through said first sheet, and a second resilient contact secured to said second conductive member and extended through said first sheet, said resilient contacts being bendable and disposed at acute angles to said carpet-like member and having a tendency to be normally in spaced relation to each other and being constructed and arranged for touching each other if an impact is exerted upon an object placed on said carpet-like member.

2. An impact-actuated circuit closer comprising a carpet-like member consisting of a pair of sheets portions of which are fastened to each other and one of which is placed upon the other, an insulating bracket member placed between said sheets and secured to one of the same, a wedge member slidably fastened to said bracket member, means for moving said wedge member along said bracket member being attached thereto, and a pair of conductive resilient members obliquely extending in the same direction at acute angles through one of said sheets from said bracket member and having a tendency to touch each other, said wedge member being placed between said resilient members for normally keeping them in spaced relation to each other in such a manner that they touch each other only if an impact is exerted upon an object placed upon that sheet through which the resilient members are extended.

References Cited in the file of this patent

UNITED STATES PATENTS

| | | |
|---|---|---|
| 637,676 | Shaw et al. | Nov. 21, 1899 |
| 1,386,517 | Lellis et al. | Aug. 2, 1921 |
| 2,325,725 | Wood | Aug. 3, 1943 |
| 2,610,277 | Hooker et al. | Sept. 9, 1952 |